United States Patent [19]

Adamson et al.

[11] Patent Number: 5,469,481
[45] Date of Patent: Nov. 21, 1995

[54] METHOD OF PREPARING FUEL CLADDING HAVING AN ALLOYED ZIRCONIUM BARRIER LAYER

[75] Inventors: Ronald B. Adamson, Fremont; Daniel R. Lutz, San Jose; Joseph S. Armijo, Saratoga, all of Calif.

[73] Assignee: General Electric Company, San Jose, Calif.

[21] Appl. No.: 215,456

[22] Filed: Mar. 21, 1994

Related U.S. Application Data

[63] Continuation-in-part of Ser. No. 91,672, Jul. 14, 1993, Pat. No. 5,383,228.

[51] Int. Cl.$^6$ .................................................. G21C 3/00
[52] U.S. Cl. .................... 376/416; 376/414; 376/457; 376/417; 376/415
[58] Field of Search .................... 376/415, 414, 376/457, 417, 415; 148/672, 682; 29/25.02, 898.03

[56] References Cited

U.S. PATENT DOCUMENTS 2,849,387  8/1958  Brugmann .................... 204/193.2

(List continued on next page.)

FOREIGN PATENT DOCUMENTS 1529664  10/1978  United Kingdom.
92/08818  5/1992  WIPO.

OTHER PUBLICATIONS

"Reactor Development Program Progress Report," Argonne National Lab., Aug. 1973.
U.S. patent application Ser. No. 08/011,559, filed Feb. 1, 1993, entitled "Composite Nuclear Fuel Container and Method for Producing Same"; inventors: Rosenbaum, Adamson & Cheng.
U.S. patent application Ser. No. 06/374,162, filed May 3, 1982; entitled "Buried Zirconium Layer"; inventor: Armijo.
U.S. patent application Ser. No. 07/894,887, filed Jun. 8, 1992, entitled "Improved Method for Producing Heat Treated Composite Nuclear Fuel Containers"; inventor: Rosenbaum.
U.S. Ser. No. 08/142,034, "Process for Improving Corrosion Resistance of Zirconium Alloy Barrier Cladding", filed Oct. 28, 1993.
Cheng and Adamson, "Mechanistic Studies of Zircaloy Nodular Corrosion", Zirconium in the Nuclear Industry: Seventh International Symposium, ASTM STP 939, pp. 387–416 (1987).
"Design and Fabrication of Fuel Rods Clad with Stainless Steel Lined Zircaloy–2," Baroch, General Electric, Feb. 1964.
"Electroplating on Zircaloy–2 with Copper," Caretta et al., Energy Nucleare, vol. 11/n.9, Sep. 1964.
"Stability and Compatibility of Hydrogen Barriers Applied to Zirconium Alloys," Brossa et al. Euratom, Jan. 1969.
"Electroplating on Zirconium and Zirconium Tin," Schickner et al., Batelle Memorial Institute, Jul. 1952.

Primary Examiner—Donald P. Walsh
Assistant Examiner—Meena Chelliah
Attorney, Agent, or Firm—James E. McGinness; Jeffrey K. Weaver

[57] ABSTRACT

A method is provided for forming a three-layer cladding tube having an outer substrate, a zirconium barrier layer, and an inner liner having alloying elements, in which the zirconium barrier layer (located between an outer substrate and inner liner) is at least partially alloyed with alloying elements that impart resistance to corrosion. The barrier layer has a diffusion layer extending from its inner surface (facing the fuel) to the barrier layer's interior (the interior being defined between the barrier layer's inner and outer surfaces). At the interior edge of the diffusion layer, there will be substantially no alloying elements beyond those normally present in zirconium. The methods of forming such structure include a diffusion anneal of a three-layer cladding in the range of 650°–1000° C. for times between about 1 minute and 20 hours. This anneal drives some of the alloying elements from the inner liner into the zirconium barrier layer to form the diffusion layer. The exact time and temperature depends upon the fabrication stage at which the heat treatment occurs.

17 Claims, 1 Drawing Sheet

U.S. PATENT DOCUMENTS

| | | | |
|---|---|---|---|
| 2,873,238 | 2/1959 | Ohlinger et al. | 204/154.2 |
| 3,018,238 | 1/1962 | Layer et al. | 204/154.2 |
| 3,085,059 | 4/1963 | Burnham | 204/193.2 |
| 3,088,893 | 5/1963 | Spalaris | 204/154.2 |
| 3,108,936 | 10/1963 | Gale | 204/151.2 |
| 3,212,988 | 10/1965 | Ringot | 376/416 |
| 3,230,150 | 1/1966 | Martin et al. | 376/416 |
| 3,354,043 | 1/1967 | Boettcher | 376/424 |
| 3,442,761 | 5/1969 | Feraday | 376/416 |
| 3,502,549 | 3/1979 | Charveriat | 204/37 |
| 3,620,691 | 11/1971 | Rubel | 29/191 |
| 3,689,324 | 9/1972 | Wiener et al. | 148/11.5 |
| 3,925,151 | 12/1975 | Klepter | 376/415 |
| 3,969,186 | 7/1976 | Thompson | 376/418 |
| 4,022,662 | 5/1977 | Gordon et al. | 376/416 |
| 4,029,545 | 6/1977 | Gordon et al. | 376/417 |
| 4,031,609 | 6/1977 | Ziegler et al. | 29/599 |
| 4,045,288 | 8/1977 | Armijo | 376/417 |
| 4,200,492 | 4/1980 | Armijo et al. | 376/417 |
| 4,372,817 | 2/1983 | Armijo et al. | 376/417 |
| 4,406,012 | 9/1983 | Gordon et al. | 376/414 |
| 4,478,364 | 10/1984 | Imahashi et al. | 228/1.31 |
| 4,576,654 | 3/1986 | Eddens et al. | 148/11.5 F |
| 4,613,479 | 9/1986 | Foster | 376/416 |
| 4,659,540 | 4/1987 | Cheng et al. | 376/417 |
| 4,718,949 | 1/1988 | Takase et al. | 148/11.5 F |
| 4,876,064 | 10/1989 | Taylor | 420/422 |
| 4,894,203 | 1/1990 | Adamson | 376/416 |
| 5,014,760 | 5/1991 | Bombeke et al. | 152/451 |
| 5,225,154 | 7/1993 | Kanno et al. | 376/416 |
| 5,247,550 | 9/1993 | Perkins et al. | 376/416 |

METHOD OF PREPARING FUEL CLADDING HAVING AN ALLOYED ZIRCONIUM BARRIER LAYER

CROSS-REFERENCE TO RELATED APPLICATIONS

This application is a continuation-in-part of U.S. patent application Ser. No. 08/091,672 entitled METHOD FOR MAKING FUEL CLADDING HAVING ZIRCONIUM BARRIER LAYERS AND INNER LINERS filed on Jul. 14, 1993, U.S. Pat. No. 5,383,228 issue on Apr. 11, 1995 assigned to the assignee hereof, and incorporated herein by reference in its entirety for all purposes.

BACKGROUND OF THE INVENTION

The present invention relates to a method of preparing fuel cladding having three-layers: an outer substrate, a zirconium barrier layer, and an inner liner. More specifically, the invention relates to methods of forming such three-layer cladding in which the zirconium barrier layer includes alloying elements to provide some measure of protection from accelerated corrosion.

Nuclear reactors have their fuel contained in sealed cladding for the isolation of the nuclear fuel from the moderator/coolant system. The term cladding, as used herein, refers to a zirconium based alloy tube. Often the cladding will be composed of various layers including a zirconium alloy substrate; and an unalloyed zirconium barrier.

The cladding—nominally in the order of 0.030 inches thick—is formed in the shape of a tube with the nuclear fuel contained typically in pellet form therein. These pellets are stacked in contact with one another for almost the entire length of each cladding tube, which cladding tube is in the order of 160 inches in length. Typically, the cladding tube is provided with springs for maintaining the axial position of the fuel pellets and so-called "getters" for absorbing: excess moisture. The internal portions of the fuel rod are pressurized with helium to help conduct the heat from the fuel material to the cladding.

Zirconium and its alloys, under normal circumstances, are excellent for nuclear fuel cladding since they have low neutron absorption cross sections and, at temperatures below about 350° C., are strong, ductile, extremely stable and relatively nonreactive in the presence of demineralized water or steam. "Zircaloys" are a family of corrosion-resistant zirconium alloy cladding materials. They are composed of 98–99% by weight zirconium, with the balance being tin, iron, chromium, and nickel. "Zircaloy-2" and "Zircaloy-4" are two widely-used zirconium-based alloys for cladding. Zircaloy-2 has on a weight basis about 1.2 to 1.7 percent tin; 0.13–0.20 percent iron; 0.06–0.15 percent chromium and 0.05 to 0.08 percent nickel. Zircaloy-4 has essentially no nickel and about 0.2% iron but is otherwise substantially similar to Zircaloy-2.

Zircaloy cladding defects may occur due to various causes including debris induced fretting and pellet-cladding interaction. In the first of these, debris lodges next to the cladding and vibrates or frets against the cladding wall under the influence of the passing steam/water mixture. Such vibration continues until the cladding wall is penetrated. Pellet-cladding interaction is caused by the interactions between the nuclear fuel, the cladding, and the fission products produced during the nuclear reaction. It has been found that this undesirable effect is due to localized mechanical stresses on the fuel cladding resulting from differential expansion and friction between the fuel and the cladding in coincidence with corrosive fission product species causing stress corrosion cracking.

To combat defects due to pellet-cladding interaction, some cladding includes pure zirconium barrier layers metallurgically bonded to the inner surface of the tubing. The pioneering work on barrier layer cladding is described in U.S. Pat. Nos. 4,200,492 and 4,372,817 to Armijo and Coffin, U.S. Pat. No. 4,610,842 to Vannesjo, and U.S. Pat. No. 4,894,203 to Adamson, each of which is incorporated herein by reference for all purposes. Barrier layers have been found to effectively prevent damage to the cladding due to interaction with the pellet. However, if the cladding wall is compromised in some manner (e.g. perforated or split by debris fretting), and water enters the fuel rod interior, the protection afforded by the barrier layer can be reduced. This is because the steam produced by water within the fuel rod can very rapidly oxidize the barrier layer. Because of the speed at which this type of corrosion occurs, it is sometimes referred to as "accelerated" corrosion.

To protect the zirconium barrier from oxidation should a cladding breach occur, a three-layer structure may be employed. See e.g., U.S. patent application Ser. No. 08/091,672 entitled METHOD FOR MAKING FUEL CLADDING HAVING ZIRCONIUM BARRIER LAYERS AND INNER LINERS and U.S. patent application Ser. No. 08/092,188 entitled INNER LINERS FOR FUEL CLADDING HAVING ZIRCONIUM BARRIER LAYERS, both of which were filed on Jul. 14, 1993 and assigned to the assignee hereof. Both applications are incorporated herein by reference in their entirety for all purposes. In addition to the substrate and zirconium barrier, three-layer cladding includes a very thin corrosion resistant inner liner bonded to the fuel side of the barrier. Typically, the inner layer will be made from a Zircaloy or modified Zircaloy. If the cladding is breached and stem forms in the fuel rod interior, the inner liner will protect the barrier from rapid oxidation. Although this three layer design represents a significant advance, methods of forming three-layer cladding can be difficult to implement to perfection. Sometimes cracks or tears in the very thin inner liner occur during fabrication.

While the methods of preparing three layer cladding taught in U.S. patent application Ser. No. 08/091,672 provide cladding having substantial protection against damage from pellet-cladding interaction and accelerated corrosion, it is still desirable to develop other methods for preparing claddings having the same or improved properties.

SUMMARY OF THE INVENTION

The present invention provides a method of forming a three-layer cladding tube in which the zirconium barrier layer (located between an outer substrate and inner liner) is at least partially alloyed with alloying elements that impart resistance to corrosion. The barrier layer preferably will have a diffusion layer containing corrosion resisting alloying elements and extending from its inner surface (facing the fuel) to the barrier layer's interior (the interior being defined between the barrier layer's inner and outer surfaces). The concentration of alloying elements forms a gradient across the diffusion layer. At the interior edge of the diffusion layer, there is substantially no alloying elements beyond those normally present in zirconium. Thus, the barrier layer will be able to retain sufficient compliance to protect against damage caused by pellet-cladding interaction.

The methods of this invention have as their goal the formation of tubing having the above structure and properties. The methods include a diffusion anneal of a three-layer cladding in the range of 650°–1000° C. (more preferably 650°–825° C.) for times between about 1 minute and 20 hours. This anneal drives some of the alloying elements from the inner liner into the zirconium barrier layer to form the diffusion layer. The exact time and temperature depends upon the fabrication stage at which the heat treatment occurs. In the normal practice, various stages would be appropriate for application of the diffusion anneal: (1) after a tubeshell has been formed but before any tube reduction cold work passes, and (2) after any one of three or more cold work passes performed after the tubeshell stage.

A preferred method of making a cladding tube according to the present invention includes the following steps: (a) bonding a zirconium barrier layer to the substrate interior surface; (b) bonding an inner liner to the zirconium barrier layer's inner surface; and (c) conducting a diffusion anneal after steps (a) and (b) at a time and temperature sufficient to cause the alloying elements from the inner liner diffuse into the barrier layer to form a diffusion layer containing a concentration of alloying elements that decreases from inner surface of the barrier layer to a location interior to the barrier layer where there is substantially no alloying elements. In general, the diffusion anneal is performed at a temperature and a time of between about 650° and 1000° C. for between about 1 minute and 20 hours. If it is performed at the tubeshell stage (before tube reduction cold work passes have been performed), the anneal is preferably conducted at a temperature of between about 650° and 825° C. for between about 4–20 hours. If, however, the diffusion anneal is conducted after a final pass cold work step, it is preferably conducted at a temperature of between about 650° and 825° C. for between about 5 minutes and 10 hours.

These and other features of the present invention will be presented in more detail in the following specification of the invention and the figures.

DESCRIPTION OF THE PREFERRED EMBODIMENTS

I. THE CLADDING TUBE STRUCTURE

As used herein, the phrase "alpha crystalline structure" or "alpha phase" means the hexagonal close-packed crystal lattice structure of zirconium and zirconium-containing alloys that is stable at lower temperatures. The temperature range in which the alpha phase is stable is referred to as the alpha range. For Zircaloy-2, the pure alpha phase exists at temperatures lower than about 820° C.

As used herein, the term "beta crystalline structure" or "beta phase" means the body-centered cubic crystal lattice structure of zirconium and zirconium-containing alloys that is stable at higher temperatures. The temperature range in which the beta phase is stable is referred to as the beta range. For Zircaloy-2, the pure beta phase exists at temperatures above about 960° C.

Figure 1:
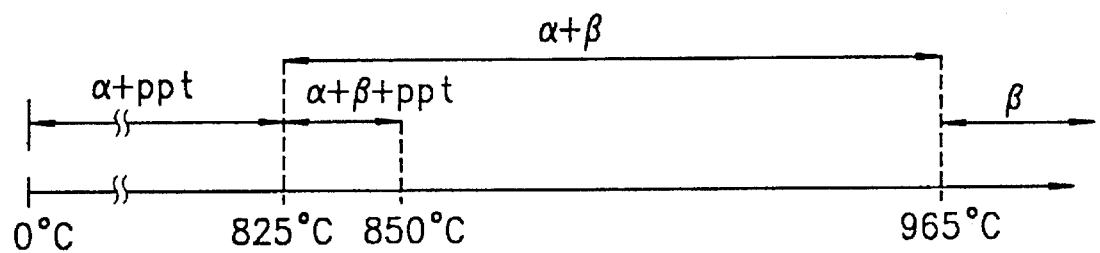
FIG. 1 is a phase chart for a typical zirconium containing alloy.

As used herein, the term "alpha plus beta crystalline structures" or "alpha plus beta phases" refers to mixtures of the alpha and beta phases that exists at some temperatures in some zirconium alloys—but not pure zirconium. In pure zirconium, the alpha crystalline structure is stable up to about 860° C. At about this temperature a phase change occurs to form a beta crystalline structure which is stable at temperatures above about 860° C. Zirconium alloys, in contrast, have a range of temperatures over which the alpha to beta phase change occurs. In this range, a mixture of alpha and beta crystalline structure is stable. The specific temperature range in which the mixture is stable depends on the specific alloy. Zircaloy-2, for example, exhibits a stable mixture of alpha plus beta crystalline structures from about 825° C. to about 965° C. Below about 850° C., intermetallic precipitates form. FIG. 1 shows the various phase regions for Zircaloy-2.

As used herein, the term "tubing" refers to a metal tube having various uses, and the term "fuel rod container" or simply "container" refers to tubing used in fuel rods to enclose fuel pellets. Sometimes the fuel rod container is referred to as "cladding" or "cladding tube".

Figure 2:
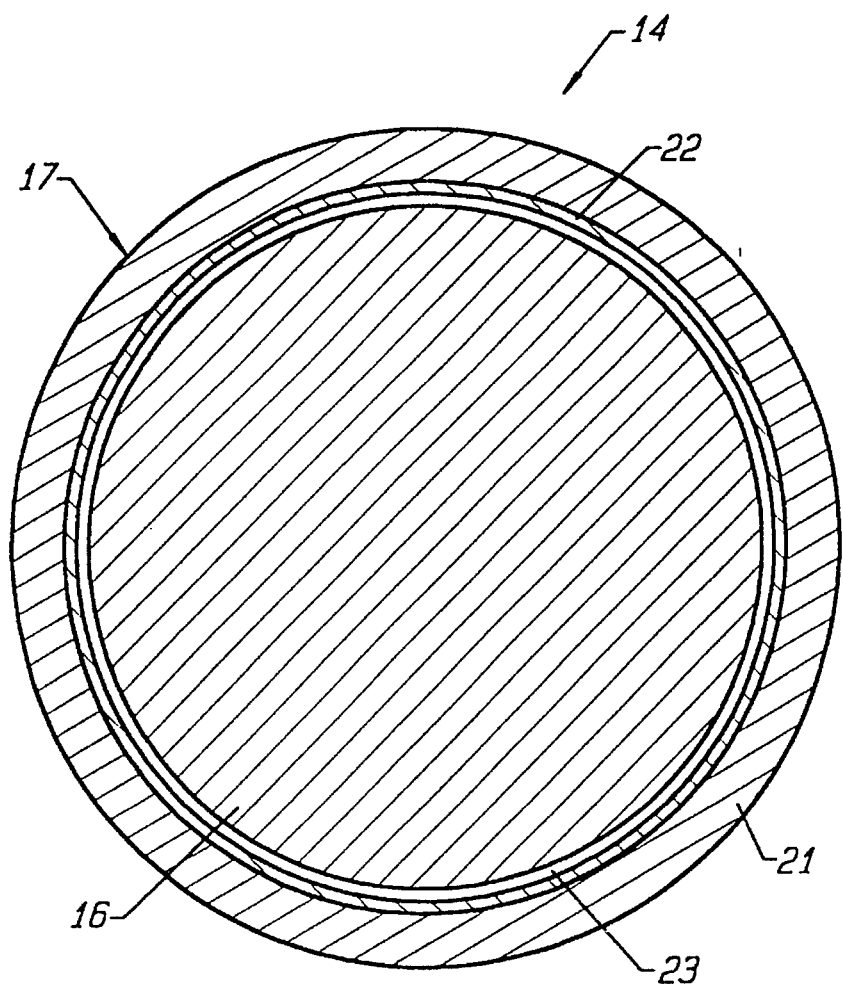
FIG. 2 is a cross sectional view of a nuclear fuel element of this invention having a substrate, a barrier layer, and an inner liner.

Referring to FIG. 2, a fuel element 14 (commonly referred to as a fuel rod) prepared according to the present invention is shown. Fuel element 14 includes a fuel material core 16 and a surrounding container 17. The fuel element 14 is designed to provide excellent thermal contact between the fuel rod container 17 and the fuel material core 16, a minimum of parasitic neutron absorption, and resistance to bowing and vibration which is occasionally caused by flow of coolant at high velocity. The fuel material core is typically composed of a plurality of fuel pellets of fissionable and/or fertile material. The fuel core may have various shapes, such as cylindrical pellets, spheres, or small particles. Various nuclear fuels may be used, including uranium compounds, thorium compounds and mixtures thereof. A preferred fuel is uranium dioxide or a mixture comprising uranium dioxide and plutonium dioxide.

The cladding tube 17 is a composite structure including a substrate 21, a zirconium barrier 22, and an inner layer or liner 23. The substrate forms the outer circumferential region of a cladding tube, the inner layer forms an inner circumferential region of the cladding tube, and the zirconium barrier is located there between.

The substrate may be made from a conventional cladding material such as a stainless steel or zirconium alloy. Suitable zirconium alloys for the substrate preferably include at least about 98% zirconium, up to about 0.25% iron, up to about 0.1% nickel, up to about 0.25% chromium, and up to about 1.7% tin (all percents by weight). Other alloying elements may include niobium, bismuth, molybdenum, as well as various other elements used in the art. Most genes;ally, any zirconium alloy with suitable corrosive resistance to water and with sufficient strength and ductility may be employed. In a preferred embodiment of this invention, the substrate is Zircaloy-2 or Zircaloy-4.

Metallurgically bonded on the inside surface of substrate 21 is the zirconium barrier 22. See the above-mentioned U.S. Pat. Nos. 4,200,492 and 4,372,817 to Armijo and Coffin, U.S. Pat. No. 4,610,842 to Vannesjo, and U.S. Pat. No. 4,894,203 to Adamson. Because the zirconium barrier is at least partially alloyed in the methods of the present invention, it resists accelerated corrosion in the event of a cladding breach and the subsequent ingress of steam. In the present invention, such protection is provided by imparting a significant alloying element concentration to the barrier layer through a diffusion anneal step. This will drive some amount of the elements from the substrate and inner liner into the zirconium barrier layer where they provide resistance to accelerated corrosion.

The alloying elements in the barrier layer should simply be present in concentrations sufficient to provide some measure of protection against accelerated corrosion without significantly compromising the compliance of the zirconium. It is especially important that the alloying elements be present at the inner surface of the zirconium barrier layer (adjacent to the inner liner). This ensures that if the barrier layer becomes exposed to a corrosive environment as a result of a defect in the inner liner, the barrier layer surface (its inner surface) will have some measure of corrosion protection. Suitable excess concentrations of alloying elements at the zirconium barrier inner surface are (on a per weight basis) at least about 0.03 percent iron, at least about 0.01 percent chromium, and at least about 0.01 percent nickel (all concentrations beyond the "unalloyed" levels for the alloying elements). More preferably, these concentrations should be between about 0.03–0.40 percent iron, between about 0.01–0.20 percent chromium, and between about 0.01–0.20 percent nickel (again, beyond the unalloyed levels).

Throughout the present specification, various references are made to "alloying elements" in the zirconium barrier layer or to an "alloyed" zirconium barrier layer. Such references are intended to include cladding tubes in which the concentration of alloying elements (e.g., iron and nickel) purposely added is in excess of the concentration of those elements in a conventional "unalloyed" zirconium barrier layer. As explained above, conventional barrier layers made to specification are of only finite purity (i.e., they typically contain some low concentration of the alloying elements). Thus, all values provided herein for alloying element concentrations refer to concentrations beyond those conventionally found in zirconium barrier layers. For example, if zirconium used in "unalloyed" barrier layers is made to a specification of 500 ppm iron, an alloyed zirconium barrier layer having 0.1 weight percent iron, will contain that weight percent plus the 500 ppm of conventional zirconium.

The barrier layer will have a diffusion layer extending from the barrier layer's inner surface (facing the fuel) to the barrier layer's interior (the interior being defined between the barrier layer's inner and outer surfaces). At the interior edge of the diffusion layer, there will be substantially no alloying elements beyond those normally present in zirconium (e.g., chromium—70 ppm or less; iron—500 ppm or less; and nickel—70 ppm or less). Preferably, the diffusion layer extends from the barrier layer's interface with the inner liner into the barrier layer interior by at most about 10% of the barrier layer's total width. This corresponds to about 8 micrometers of a conventional 75 micrometer barrier layer's total radial thickness. In more preferred embodiments, the diffusion layer has a thickness of at most about 5% of the barrier layer's total width.

Metallurgically bonded to the inside surface of the zirconium barrier 22 is the inner liner 23. This layer provides some protection of the zirconium barrier from rapid oxidation should the fuel element interior come in contact with steam. Thus, the inner liner should be a relatively corrosion resistant material such as Zircaloy. However, modified Zircaloys and other corrosion resistant materials may also be employed. For example, the inner liner may be softer than conventional Zircaloy so that crack initiation and propagation on the inner surface of the cladding tube are minimized. See U.S. patent application Ser. No. 08/092,188, previously incorporated herein by reference. In an alternative embodiment, the inner liner may be made from an alloy designed to have strongly hydrogen absorbing properties. One such material is a zirconium alloy having a high concentration of nickel (e.g., up to 15% nickel).

In some embodiments, the inner liner is so thin that it is completely consumed by interdiffusion with the barrier layer in a diffusion anneal. The resulting cladding contains a barrier layer having significant resistance to accelerated corrosion because of the increased alloying element concentration at the barrier layer inner region (where it is most susceptible to corrosion). The diffusion anneal also homogenizes the concentration distribution over the barrier layer's inner surface. This advantage also results when the inner liner is retained in the final cladding. Thus, if there were any tears or other defects in the inner liner (that could provide a site for accelerated corrosion), the diffusion anneal causes the alloying elements to move into the barrier layer at these defects sites to protect against accelerated corrosion. Aside from the inner liner being completely consumed in a diffusion anneal, the product cladding tube is structurally similar to the three-layer cladding tube described above.

Further details of the structure formed according to the methods of this invention are found in U.S. patent application Ser. No. 08/215,458 entitled A NUCLEAR FUEL CLADDING HAVING AN ALLOYED ZIRCONIUM BARRIER LAYER filed concurrently herewith, assigned to the assignee hereof, and incorporated herein by reference for all purposes.

II. MANUFACTURE OF THE TUBING

The methods of this invention have as their goal the formation of tubing having the above structure and properties. The methods includes a diffusion anneal of a three-layer cladding in the range of 650°–1000° C. (more preferably 650°–825° C.) for times between about 1 minute and 20 hours. The exact time and temperature depends upon the fabrication stage at which the heat treatment occurs. In the normal practice, various stages would be appropriate for application of the diffusion anneal: (1) after the tubeshell has been formed but before any tube reduction cold work passes, and (2) after any of the three or more cold work passes performed after the tubeshell stage. An overview of the process discussing the tubeshell and cold work stages is provided below.

Since the invention depends on diffusion of alloying elements (particularly iron and nickel) through the zirconium barrier layer, the relevant variables associated with the diffusion anneal are time, temperature, and barrier thickness. Thus, at stages in the process when the barrier layer is thin (e.g. after the final pass cold work), relatively low temperatures and/or short times should be employed. Conversely, at stages when the barrier layer is relatively thicker (e.g., at the tubeshell stage), relatively high temperatures and/or long times should be employed. At the tubeshell stage, suitable temperatures and times include about 650°–825° C. for between about 4 and 20 hours. At 825° C., the time should be closer to 4 hours, while at 650° C., time should be between about 10 and 20 hours. At a final tubing stage (after the last pass of cold work), suitable temperatures and times include about 650°–825° C. for between about 5 minutes and 10 hours. At temperatures approaching 825° C., the diffusion time should approach 5 minutes. In all cases, care should be taken to ensure that the diffusion anneal is not conducted to such an extent that the alloying element concentration is increased across the entire zirconium barrier layer. The anneal should produce a diffusion layer containing a concentration of alloying elements that decreases from inner surface of the barrier layer to a location interior to the barrier layer where there is substantially no alloying elements. In some cases, the anneal will be conducted under conditions in which the inner liner is completely consumed within the barrier layer.

As will be apparent to those of skill in the art, the diffusion anneal can be performed with various commercially available pieces of equipment such as a vacuum furnace, an inert gas furnace, or an induction coil. Suitable vacuum annealing furnaces are available from Centorr Vacuum Industries of Nashua, New Hampshire.

Generally the process is started with a Zircaloy or other suitable alloy ingot melt which is forged, pierced, and expanded to produce a thick-walled billet. The billet is subsequently quenched from the beta phase. Thereafter, an extrusion step and possibly some cold working, annealing, and surface conditioning steps designed for dimensional stability are employed. This results in a tubular section referred to as a tubeshell which is subsequently subjected to various annealing, cold working, and other steps to produce the final fuel rod cladding. At some point after the beta quench, the barrier layer and inner liner are bonded to the interior of the substrate (the exterior surface of the inner liner is actually bonded to the interior surface of the barrier layer). Both of these layers are provided as sleeves formed in one or more steps from billets of the appropriate material—zirconium for the barrier layer and a zirconium alloy for the inner liner.

Various methods may be employed to bond the three components to one another. However, because the extrusion step must be conducted regardless of any other techniques employed to bond the components, extrusion is the preferred bonding process. In this approach, the extrusion process itself provides the necessary energy (in the form of compression) to bond the three layers. Other suitable bonding processes are described in U.S. patent application Ser. No. 08/091,672 previously incorporated by reference. It should be noted, that the three components are typically bonded to one another in a single step, but this is not required. For example, the zirconium barrier layer could be bonded to the substrate in one step, and the inner liner could be bonded to the substrate/barrier layer in a second step.

Extrusion is accomplished by putting the tube through a set of tapered dies under high pressure at about 1000° to 1400° F. (about 538° to 760° C.). Suitable extruders are available from Mannessmann Demang, Coreobolis, Pennsylvania. After extrusion, the composite is subjected to a conventional annealing and tube reduction processes to produce a product known as a "tubeshell" which is available in specified dimensions and compositions from various vendors such as Teledyne Wahchang (Albany, Oreg. USA), Western Zirconium (A Westinghouse company of Ogden, Utah), and Cezus (France).

The three-layer structure formed by bonding is normally annealed and reduced to a standard diameter (e.g. about 2.5 inches) by cold work. A post-cold work annealing step and some surface conditioning may also be conducted. The resulting tubing is referred to as a tubeshell.

The tubeshell is subjected to multiple passes of cold working—usually with a pilger mill—to impart the dimensions required for a particular application. After each cold work step, an anneal is conducted for e.g. about two to four hours to relieve stress and regain ductility. Preferably, the cold work passes are each conducted to between about 30 and 80%, although this is not critical to the invention. The percent value of cold work is roughly analogous to the percent reduction of wall thickness during the process. It will be understood by the reader that pilger mills are generally available, albeit fairly complicated, pieces of equipment. During cold working with a pilger mill, a shaped die is rolled on the outside of the tube while a hard tapered mandrel supports the inside of the tube. In this manner, the wall thickness and diameter of the tube are simultaneously reduced. Further details of the cold working process are provided in the above-mentioned U.S. patent application Ser. No. 08/091,672.

To impart additional corrosion resistance to the outer circumferential region of the substrate, a step of selectively heating and rapidly quenching the outer region from the alpha plus beta region or the pure beta region while maintaining the inner region at a lower temperature preferably may be performed during the subsequent tube reduction processing. This creates a metallurgical gradient in which the outer region contains fine precipitates, while the inner region retains coarse precipitates. This heat treatment step can be accomplished by various methods including induction coil heating as described below. It may also be desirable to create or preserve coarse precipitates in the inner region of the tube by performing at least one high temperature anneal and/or performing the recrystallization anneals at relatively high temperatures. As used herein, a high temperature anneal refers to a process conducted at between about 650° and 825° C. for between about 1 and 100 hours. A coarse precipitate microstructure generally resists crack propagation. A more detailed discussion of the procedure employed to produce this microstructure is provided in U.S. patent application Ser. No. 08/052,793 entitled ZIRCALOY TUBING HAVING HIGH RESISTANCE TO CRACK PROPAGATION and U.S. patent application Ser. No. 08/052,791 entitled METHOD OF FABRICATING ZIRCALOY TUBING HAVING HIGH RESISTANCE TO CRACK PROPAGATION, both of which were filed on Apr. 23, 1993, assigned to the assignee hereof, and are incorporated herein by reference for all purposes.

In some embodiments, it will be desirable to perform an etch or other surface conditioning step to remove the inner liner from the cladding. This will yield a cladding in which the zirconium barrier layer forms the inner circumferential surface. Chemical and mechanical surface conditioning steps are currently employed in cladding fabrication. These include honing, grinding, sanding, machining with a lathe, buffing, chemical etching, and chemical mechanical polishing.

For ease in understanding the processes of this invention, a specific preferred process according to this invention is now described. It should be understood that although the conditions described in this example are quite specific, each step of the process could be conducted under a range of conditions. The process is started with a hollow Zircaloy billet of approximately six to ten inches in diameter and two feet in length. The billet will form the substrate of a structure by the end of the process. At that point, the billet will be convened to about 400 feet of tubing having about a one-half inch outer diameter.

First, the billet is rapidly quenched. Generally, the quench involves heating the billet above about 1000° C., and then rapidly cooling from 1000° C. to about 700° C. by immersion in a tank of water. Maintaining a proper quench rate is important in the temperature range between 1000° C. and 700° C.; after 700° C. is reached, however, the rate of cooling can be increased or decreased as desired.

After quenching, a tube of the metal selected to be the zirconium barrier and a tube of the material selected to be the inner finer are concentrically inserted into the hollow billet. The ends of the billet, barrier, and inner liner tubes are then bonded by electron beam welding. The welded tube is extruded at a tube temperature of about 570° C. to produce a tube having a diameter of about 3 inches. The extruded tube is further annealed and cold worked to produce a tubeshell of about 2.5 inches in diameter.

At this stage a diffusion anneal is performed at about 800° C. for about four hours to produce a three layer cladding having a diffusion layer as described above. This step can have the additional advantage of coarsening the precipitates in the billet, thereby improving resistance to axial crack propagation. In the subsequent processing, the tube diameter and wall thickness are reduced, but the barrier layer concentration profile will still include a corrosion-resistant diffusion layer.

The tubeshell is subjected to three cold work passes in a pilger mill. It will be understood by the reader that pilger mills are generally available, albeit fairly complicated, pieces of equipment. During cold working with a pilger mill, a shaped die is rolled on the outside of the tube while it hard tapered mandrel supports the inside of the tube. In this manner, the wall thickness and diameter of the tube are simultaneously reduced.

The first pass cold work step is typically performed to about 69%. This percent value is roughly analogous to the percent reduction of the wall thickness. If the tube is given too much cold work in a single pass, it may crack during manufacture. To relieve the stress caused by cold working, the tube is annealed at about 593° C. for two hours in a large vacuum annealing furnace such as that described above (available from Centorr Vacuum Industries, located in Nashua, N.H.).

Next, the tube is heat treated at about 927° C. on the outer 15% of the wall. This is accomplished by heating the tubeshell with a high-energy or frequency (from an induction coil) which penetrates at most about 33% of the wall. During the induction heating water flows through the tube center. This serves two purposes: first it maintains the interior of the tube at a lower temperature while the outer region is heated, and second it very rapidly quenches the entire tube when the heating energy is removed. It is important to recognize that the inner portion of the tubeshell is not substantially heated. Further details of the induction heating process are provided in U.S. Pat. No. 4,576,654 to Eddens which is incorporated herein by reference for all purposes. This selective heating step imparts corrosion resistance to the outer region of the substrate by producing fine precipitates therein.

At this point, a second pass cold work is performed (this time to about 74%) with a pilger mill. To remove the stress induced by this second pass cold work step, another anneal (again at 593° C. for about 2 hours) is performed. Finally, the third pass cold work is performed as before. This reduces the tube to its final size—about one-half inch outer diameter with a nominal wall thickness of roughly 30 mils.

This tube is cut up into lengths for fuel rods (i.e. about 14 feet long) and given a final recrystallization anneal at 577° C. for about two hours. Alternatively, the final anneal could be a stress relief anneal conducted at any temperature between about 480° C. to 577° C. After the final anneal, the tube is ready for use in the reactor.

It will be recognized by those of skill in the art that various steps are performed in addition to those listed in the above. For example, chemical etching is employed to remove superficial defects caused by the tube reduction mill. Further, straightening of tubes is often performed with pieces of equipment designed for this purpose. In addition, various nondestructive tests such as corrosion tests and ultrasonic tests for crack imperfections in the surface are performed. This is not an exhaustive list, but merely serves to describe some steps which may be employed.

The composite tubing of this invention can be used to make nuclear fuel elements by first affixing a closure to one end of the cladding tube so that only one open end remains. The completed fuel element is then prepared by filling the cladding container with nuclear fuel material, inserting a nuclear fuel material retaining means into the cavity, evacuating the cladding tube interior, pressurizing the interior with helium, applying a closure to the open end of the container, and bonding the ends of the cladding container to the closure to form a tight seal there between.

Although the foregoing invention has been described in some detail for purposes of clarity of understanding, it will be apparent that certain changes and modifications may be practiced within the scope of the appended claims. For instance, although the specification has described three or four passes of cold work, other suitable processes having more or fewer cold work passes may be used as well.

What is claimed is:

1. A method of making a cladding tube having an outer substrate, an intermediate zirconium barrier layer, and a zirconium-based inner liner having alloying elements, the substrate, barrier layer, and inner liner each having interior and exterior circumferential surfaces, the method comprising the following steps:

(a) bonding the zirconium barrier layer exterior circumferential surface to the substrate interior circumferential surface;

(b) bonding the inner liner outer circumferential surface to the zirconium barrier layer inner circumferential surface; and (c) conducting a diffusion anneal after steps (a) and (b) at a time and temperature sufficient to cause the alloying elements from the inner liner to diffuse into the barrier layer to form a diffusion layer containing a concentration of alloying elements that decreases from the interior circumferential surface of the barrier layer to a location interior to the barrier layer where there is substantially no alloying elements, wherein the alloying elements in the diffusion layer impart corrosion resistance to the barrier layer.

2. The method of claim 1 wherein the step of conducting a diffusion anneal is performed at a temperature and a time of between about 650° and 1000° C. for between about 1 minute and 20 hours.

3. The method of claim 1 wherein the step of conducting a diffusion anneal is performed after formation of a tubeshell.

4. The method of claim 3 wherein the step of conducting a diffusion anneal is performed at a temperature of between about 650° and 825° C. for between about 4–20 hours.

5. The method of claim 1 wherein the step of conducting a diffusion anneal is performed after a final pass cold work step.

6. The method of claim 5 wherein the step of conducting a diffusion anneal is performed at a temperature of between about 650° and 825° C. for between about 5 minutes and 10 hours.

7. The method of claim 1 wherein steps (a) and (b) are conducted as a single step.

8. The method of claim 1 further comprising a step of removing the inner liner by a surface conditioning process.

9. A cladding tube having an outer substrate, an intermediate zirconium barrier layer, and a zirconium-based inner liner having alloying elements, the substrate, barrier layer, and inner liner each having interior and exterior circumferential surfaces, the cladding tube being made by a process comprising the following steps:

(a) bonding the zirconium barrier layer exterior circumferential surface to the substrate interior circumferential surface;

(b) bonding the inner liner outer circumferential surface to the zirconium barrier layer inner circumferential surface; and (c) conducting a diffusion anneal after steps (a) and (b) at a time and temperature sufficient to cause the alloying elements from the inner liner to diffuse into the barrier layer to form a diffusion layer containing a concentration of alloying elements that decreases from the interior circumferential surface of the barrier layer to a location interior to the barrier layer where there is substantially no alloying elements, wherein the alloying elements in the diffusion layer impart corrosion resistance to the barrier layer.

10. The cladding tube of claim 1 wherein the step of conducting a diffusion anneal is performed at a temperature and a time of between about 650° and 1000° C. for between about 5 minutes and 20 hours.

11. The cladding tube of claim 1 wherein the step of conducting a diffusion anneal is performed after formation of a tubeshell.

12. The cladding tube of claim 1 wherein the step of conducting a diffusion anneal is performed after a final pass cold work step.

13. A method of making a cladding tube having an outer substrate, an intermediate zirconium barrier layer, and an inner liner having alloying elements, the substrate, barrier layer, and inner liner each having interior and exterior circumferential surfaces, the method comprising the following steps:

(a) bonding the zirconium barrier layer exterior circumferential surface to the substrate interior circumferential surface and bonding the inner liner outer circumferential surface to the zirconium barrier layer inner circumferential surface to form a tubeshell;

(b) conducting a diffusion anneal at a time and temperature sufficient to cause the alloying elements from the inner liner to diffuse into the barrier layer to form a diffusion layer containing a concentration of alloying elements that decreases from the interior circumferential surface of the barrier layer to a location interior to the barrier layer where there is substantially no alloying elements;

(c) performing two or more cold work steps, each followed by a stress relief or recrystallization anneal; and (d) heating at most about the outer 33% of the outer substrate into the alpha plus beta or beta phase and then cooling to produce a distribution of fine precipitates in the outer region of the substrate, wherein the alloying elements in the diffusion layer impart corrosion resistance to the barrier layer.

14. The method of claim 13 wherein the step of conducting a diffusion anneal is performed at a temperature and a time of between about between about 650° and 825° C. for between about 4 hours and 20 hours.

15. The method of claim 14 wherein the step of conducting a diffusion anneal is performed at a temperature and a time of between about between about 800° and 825° C. for between about 4 hours and 6 hours.

16. The method of claim 13 further comprising a step of removing the inner liner by a surface conditioning process.

17. The method of claim 16 wherein the surface conditioning process is a chemical etch.

* * * * *